(12) United States Patent
Kwon et al.

(10) Patent No.: US 10,705,681 B2
(45) Date of Patent: Jul. 7, 2020

(54) ELECTRONIC DEVICE AND DISPLAY METHOD FOR SELECTING AN AREA OF AN ICON

(71) Applicant: Samsung Electronics Co., Ltd., Suwon-si, Gyeonggi-do (KR)

(72) Inventors: Hyeok Min Kwon, Suwon-si (KR); Dae Won Kim, Seoul (KR); Young Ha Park, Suwon-si (KR); Kyu Ho Lee, Seoul (KR); Young Sik Park, Seongnam-si (KR); Sang Uk Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 15/485,884

(22) Filed: Apr. 12, 2017

(65) Prior Publication Data

US 2017/0308269 A1    Oct. 26, 2017

(30) Foreign Application Priority Data

Apr. 21, 2016 (KR) .................. 10-2016-0048786

(51) Int. Cl.
*G06F 3/0481* (2013.01)
*G06F 9/451* (2018.01)
*G06F 3/0482* (2013.01)
*G06F 3/0484* (2013.01)

(52) U.S. Cl.
CPC ........ *G06F 3/04817* (2013.01); *G06F 3/0482* (2013.01); *G06F 3/04845* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 5,428,736 A | 6/1995 | Kahl et al. | |
| 5,548,692 A | 8/1996 | Cok | |
| 5,742,779 A | 4/1998 | Steele | |
| 5,973,694 A | 10/1999 | Steele et al. | |
| 6,844,887 B2 | 1/2005 | Laffey et al. | |
| 7,216,304 B1 | 5/2007 | Gourdol et al. | |
| 7,730,422 B2 | 6/2010 | Russo | |
| 8,223,165 B1 * | 7/2012 | Jitkoff ............ | G06T 3/0012 345/581 |
| 8,429,562 B2 | 4/2013 | Gourdol et al. | |
| 8,607,161 B2 | 12/2013 | Solanki et al. | |
| 9,069,877 B2 | 6/2015 | Collins et al. | |
| 2003/0007016 A1 | 1/2003 | Laffey et al. | |

(Continued)

*Primary Examiner* — Beau D Spratt
(74) *Attorney, Agent, or Firm* — Jefferson IP Law, LLP

(57) ABSTRACT

An electronic device is provided. The electronic device includes a display, a memory that stores icon image associated with an application, and a processor. The processor selects a partial area of the icon image, determines whether a type of an image included in the selected area is a first image type or a second image type, displays, if the type of the image included in the selected area is the first image type, the image included in the selected area in the display at a first magnification, and displays, if the type of the image included in the selected area is the second image type, the image included in the selected area in the display at a second magnification.

7 Claims, 11 Drawing Sheets

<910>

<920>

(56) References Cited

U.S. PATENT DOCUMENTS

| | | | |
|---|---|---|---|
| 2007/0011622 A1* | 1/2007 | Chae | G06F 3/04817 |
| | | | 715/764 |
| 2007/0046687 A1* | 3/2007 | Soroushi | G06F 3/14 |
| | | | 345/589 |
| 2007/0079255 A1 | 4/2007 | Gourdol et al. | |
| 2007/0174782 A1 | 7/2007 | Russo | |
| 2007/0209022 A1 | 9/2007 | Gourdol et al. | |
| 2008/0104544 A1 | 5/2008 | Collins et al. | |
| 2009/0282352 A1 | 11/2009 | Solanki et al. | |
| 2011/0258581 A1 | 10/2011 | Hu | |
| 2012/0192111 A1 | 7/2012 | Hsu et al. | |
| 2013/0311920 A1* | 11/2013 | Koo | G06F 3/04883 |
| | | | 715/765 |
| 2016/0125848 A1* | 5/2016 | Chen | G09G 5/37 |
| | | | 345/589 |
| 2016/0246475 A1* | 8/2016 | Garcia | G06F 3/04817 |
| 2017/0132836 A1* | 5/2017 | Iverson | G06T 15/04 |
| 2017/0235439 A1* | 8/2017 | Lu | G06F 3/0482 |
| | | | 715/812 |

* cited by examiner

ELECTRONIC DEVICE AND DISPLAY METHOD FOR SELECTING AN AREA OF AN ICON

CROSS-REFERENCE TO RELATED APPLICATION(S)

This application claims the benefit under 35 U.S.C. § 119(a) of a Korean patent application filed on Apr. 21, 2016 in the Korean Intellectual Property Office and assigned Serial number 10-2016-0048786, the entire disclosure of which is hereby incorporated by reference.

TECHNICAL FIELD

The present disclosure relates to a method of displaying an icon in a display included in an electronic device. More particularly, the present disclosure relates to a method and a device that identically matches sizes of icons displayed in a display.

BACKGROUND

With the development of mobile communication technologies, an electronic device changes to freely connect to a wireless/wired network and to be easily portable. For example, the electronic device, such as a smartphone or a tablet personal computer (PC), supports various functions as well as call and message functions based on an application program that was installed in the electronic device.

The application program installed in the electronic device may be performed through an application icon. The electronic device may display icons of applications, which are installed in the electronic device, in a display.

An icon image of an application may have a specified size. Application developers may design the icon image within an image area of the specified size. The application developers may design the icon image by using all image area of the allocated size. Alternatively, the application developers may design the icon image without using a part of the allocated area. Accordingly, icon sizes may be differently displayed for each application.

Therefore, a need exists for a method of displaying an icon in a display included in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device that identically matches sizes of icons displayed in a display.

In accordance with an aspect of the present disclosure, an electronic device is provided. The electronic device includes a display, a memory that stores icon image associated with an application, and a processor. The processor selects a partial area of the icon image, determines whether a type of an image included in the selected area is a first image type or a second image type, displays, if the type of the image included in the selected area is the first image type, the image included in the selected area in the display at a first magnification, and displays, if the type of the image included in the selected area is the second image type, the image included in the selected area in the display at a second magnification.

In accordance with another aspect of the present disclosure, a display method of an electronic device is provided. The method includes storing an icon image associated with an application in a memory, selecting a partial area of the icon image, determining whether a type of an image included in the selected area is a first image type or a second image type, displaying, if the type of the image included in the selected area is the first image type, the image included in the selected area in the display at a first magnification, and displaying, if the type of the image included in the selected area is the second image type, the image included in the selected area in the display at a second magnification.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
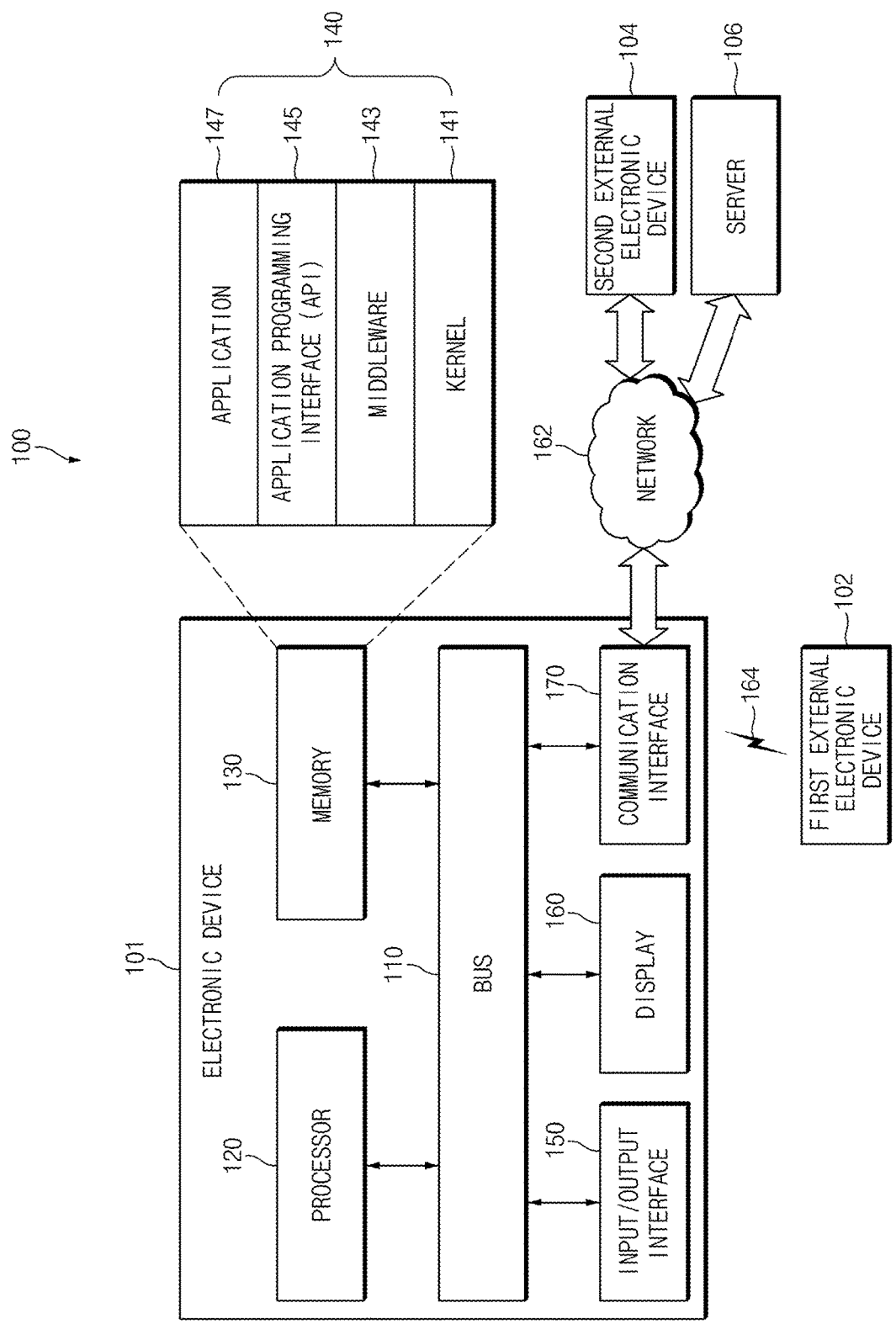
FIG. 1 illustrates an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include," "comprise," and "have", or "may include," or "may comprise" and "may have" used herein indicates disclosed functions, operations, or existence of elements but does not exclude other functions, operations or elements.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), a moving picture experts group phase 1 or phase 2 (MPEG-1 or MPEG-2) audio layer 3 (MP3) players, mobile medical devices, cameras, or wearable devices. According to various embodiments of the present disclosure, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or Play Station™), an electronic dictionary, an electronic key, a camcorder, or an electronic picture frame.

In various embodiments of the present disclosure, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. In addition, electronic devices according to various embodiments of the present disclosure are not limited to the above-mentioned devices, and may include new electronic devices according to technology development.

Hereinafter, an electronic device according to various embodiments of the present disclosure will be described with reference to the accompanying drawings. The term "user" used herein may refer to a person who uses an electronic device or may refer to a device (e.g., an artificial intelligence electronic device) that uses an electronic device.

FIG. 1 illustrates an electronic device in a network environment according to an embodiment of the present disclosure.

Referring to FIG. 1, an electronic device 101 in a network environment 100 according to various embodiments of the present disclosure will be described. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a CPU, an AP, or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols, such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of Wi-Fi, Bluetooth, Bluetooth low energy (BLE), ZigBee, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the internet, or a telephone network.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
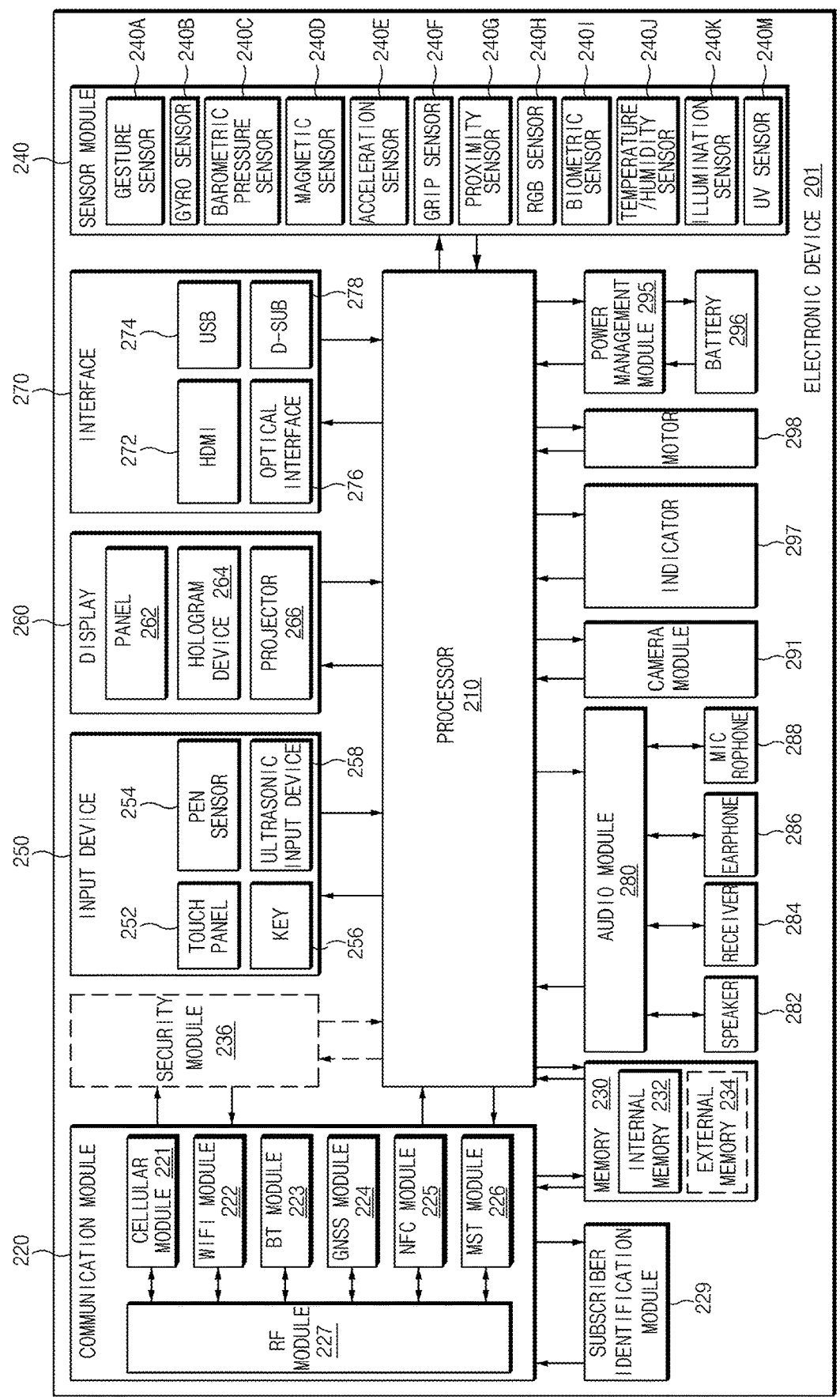
FIG. 2 illustrates a block diagram of an electronic device according to an embodiment of the present disclosure.

FIG. 2 is a block diagram illustrating an electronic device according to an embodiment of the present disclosure.

Referring to FIG. 2, an electronic device 201 may include, for example, a part or the entirety of the electronic device 101 illustrated in FIG. 1. The electronic device 201 may include at least one processor (e.g., AP) 210, a communication module 220, a subscriber identification module (SIM) 229, a memory 230, a sensor module 240, an input device 250, a display 260, an interface 270, an audio module 280, a camera module 291, a power management module 295, a battery 296, an indicator 297, and a motor 298.

The processor 210 may run an OS or an application program so as to control a plurality of hardware or software elements connected to the processor 210, and may process various data and perform operations. The processor 210 may be implemented with, for example, a system on chip (SoC). According to an embodiment of the present disclosure, the processor 210 may further include a graphics processing unit (GPU) and/or an image signal processor (ISP). The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1. The communication module 220 may include, for example, a cellular module 221, a Wi-Fi module 222, a Bluetooth module 223, a GNSS module 224 (e.g., a GPS module, a GLONASS module, a BeiDou module, or a Galileo module), an NFC module 225, an MST module 226 and a radio frequency (RF) module 227.

The cellular module 221 may provide, for example, a voice call service, a video call service, a text message service, or an internet service through a communication network. The cellular module 221 may identify and authenticate the electronic device 201 in the communication network using the SIM 229 (e.g., a SIM card). The cellular module 221 may perform at least a part of functions that may be provided by the processor 210. The cellular module 221 may include a CP.

Each of the Wi-Fi module 222, the Bluetooth module 223, the GNSS module 224, the NFC module 225 and the MST module 226 may include, for example, a processor for processing data transmitted/received through the modules. According to some various embodiments of the present disclosure, at least a part (e.g., two or more) of the cellular module 221, the Wi-Fi module 222, the Bluetooth module 223, the GNSS module 224, the NFC module 225 and the MST module 226 may be included in a single integrated chip (IC) or IC package.

The RF module 227 may transmit/receive, for example, communication signals (e.g., RF signals). The RF module 227 may include, for example, a transceiver, a power amp module (PAM), a frequency filter, a low noise amplifier (LNA), an antenna, or the like. According to another embodiment of the present disclosure, at least one of the cellular module 221, the Wi-Fi module 222, the Bluetooth module 223, the GNSS module 224, the NFC module 225 and the MST module 226 may transmit/receive RF signals through a separate RF module.

The SIM 229 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of a volatile memory (e.g., a dynamic random access memory (RAM) (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 234 may include a flash drive, such as a compact flash (CF), a secure digital (SD), a micro-SD, a mini-SD, an extreme digital (xD), a multimedia card (MMC), a memory stick, or the like. The external memory 234 may be operatively and/or physically connected to the electronic device 201 through various interfaces.

A security module 236, which is a module including a storage space that is higher in security level than the memory 230, may be a circuit for securing safe data storage and protected execution circumstances. The security module 236 may be implemented with an additional circuit and may include an additional processor. The security module 236 may be present in an attachable smart chip or SD card, or may include an embedded secure element (eSE), which is installed in a fixed chip. Additionally, the security module 236 may be driven in another OS which is different from the OS of the electronic device 201. For example, the security module 236 may operate based on a java card open platform (JCOP) OS.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, IR, and UV detection methods. The touch panel 252 may further include a control circuit. The touch panel 252 may further include a tactile layer so as to provide a haptic feedback to a user.

The (digital) pen sensor 254 may include, for example, a sheet for recognition which is a part of a touch panel or is separate. The key 256 may include, for example, a physical button, an optical button, or a keypad. The ultrasonic input device 258 may detect ultrasonic waves generated by an input tool through a microphone 288 so as to identify data corresponding to the detected the ultrasonic waves.

The display 260 (e.g., the display 160) may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/MMC interface, or an IR data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an ISP, or a flash (e.g., an LED or a xenon lamp).

The power management module 295 may manage power of the electronic device 201. According to an embodiment of the present disclosure, the power management module 295 may include a power management IC (PMIC), a charger IC, or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFLO™, or the like.

Figure 3:
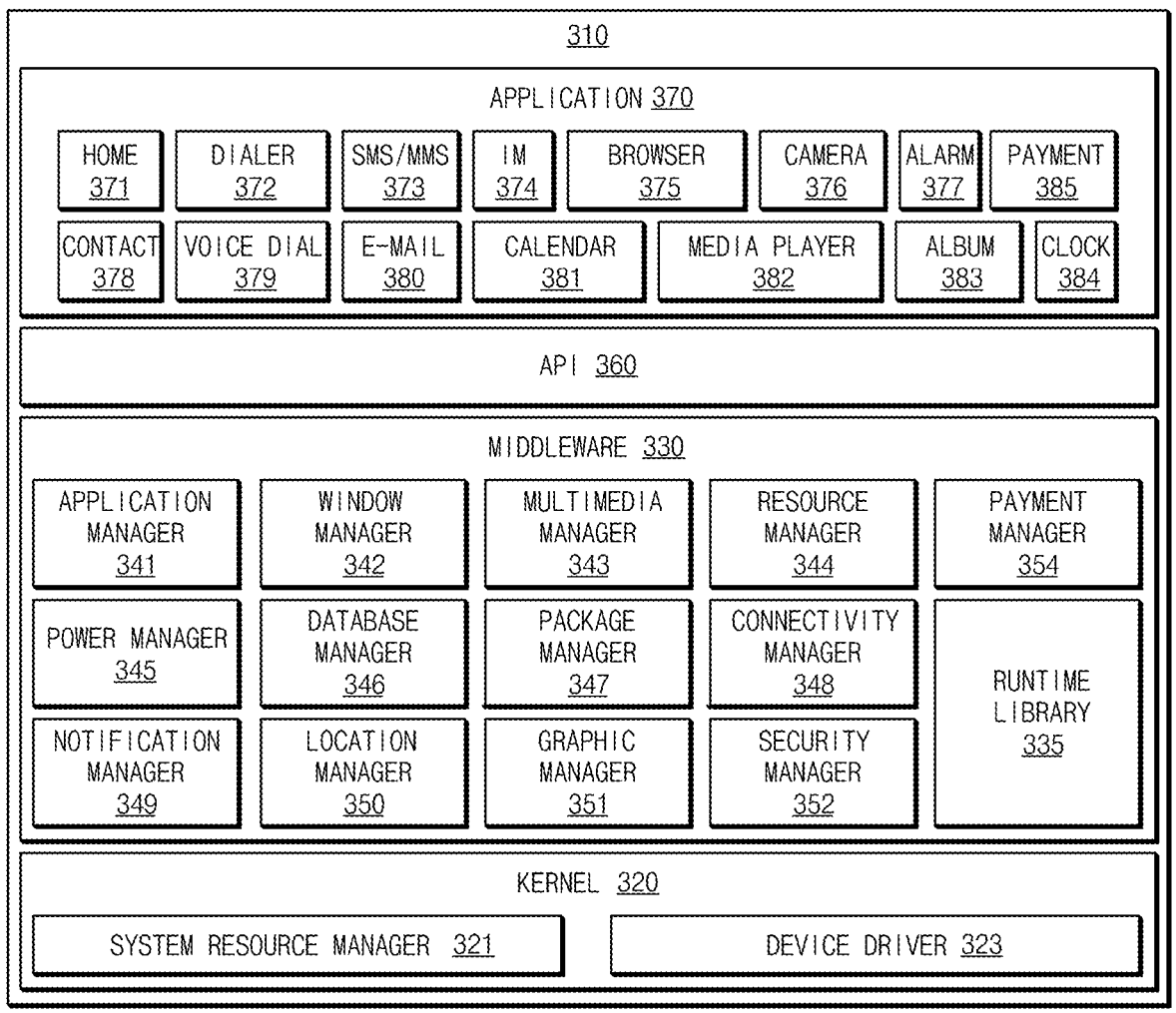
FIG. 3 illustrates a block diagram of a program module according to an embodiment of the present disclosure.

FIG. 3 is a block diagram illustrating a program module according to an embodiment of the present disclosure.

Referring to FIG. 3, a program module 310 (e.g., the program 140) may include an OS for controlling a resource related to an electronic device (e.g., the electronic device 101) and/or various applications (e.g., the application program 147) running on the OS. The OS may be, for example, Android, iOS, Windows, Symbian, Tizen, or the like.

The program module 310 may include a kernel 320, a middleware 330, an API 360, and/or an application 370. At least a part of the program module 310 may be preloaded on an electronic device or may be downloaded from an external electronic device (e.g., the first electronic device 102, the second external electronic device 104, or the server 106).

The kernel 320 (e.g., the kernel 141) may include, for example, a system resource manager 321 or a device driver 323. The system resource manager 321 may perform control, allocation, or retrieval of a system resource. According to an embodiment of the present disclosure, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide a function that the applications 370 require in common, or may provide various functions to the applications 370 through the API 360 so that the applications 370 may efficiently use limited system resources in the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352 and payment manager 354.

The runtime library 335 may include, for example, a library module that a complier uses to add a new function through a programming language while the application 370 is running. The runtime library 335 may perform a function for input/output management, memory management, or an arithmetic function.

The application manager 341 may mange, for example, a life cycle of at least one of the applications 370. The window manager 342 may manage a GUI resource used in a screen. The multimedia manager 343 may recognize a format required for playing various media files and may encode or decode a media file using a codec matched to the format. The resource manager 344 may manage a resource, such as a source code, a memory, or a storage space of at least one of the applications 370.

The power manager 345, for example, may operate together with a basic input/output system (BIOS) to manage a battery or power and may provide power information required for operating the electronic device. The database manager 346 may generate, search, or modify a database to be used in at least one of the applications 370. The package manager 347 may manage installation or update of an application distributed in a package file format.

The connectivity manger 348 may manage wireless connection of Wi-Fi, Bluetooth, or the like. The notification manager 349 may display or notify an event, such as message arrival, appointments, and proximity alerts in such a manner as not to disturb a user. The location manager 350 may manage location information of the electronic device. The graphic manager 351 may manage a graphic effect to be provided to a user or a user interface related thereto. The security manager 352 may provide various security functions required for system security or user authentication. According to an embodiment of the present disclosure, in the case in which an electronic device (e.g., the electronic device 101) includes a phone function, the middleware 330 may further include a telephony manager for managing a voice or video call function of the electronic device.

The middleware 330 may include a middleware module for forming a combination of various functions of the above-mentioned elements. The middleware 330 may provide a module specialized for each type of an OS to provide differentiated functions. Furthermore, the middleware 330 may delete a part of existing elements or may add new elements dynamically.

The API 360 (e.g., the API 145) which is, for example, a set of API programming functions may be provided in different configurations according to an OS. For example, in the case of Android or iOS, one API set may be provided for each platform, and, in the case of Tizen, at least two API sets may be provided for each platform.

The application 370 (e.g., the application program 147), for example, may include at least one application capable of performing functions, such as a home 371, a dialer 372, a short message service (SMS)/multimedia message service (MMS) 373, an instant message (IM) 374, a browser 375, a camera 376, an alarm 377, a contact 378, a voice dial 379, an e-mail 380, a calendar 381, a media player 382, an album 383, a clock 384, a payment 385, health care (e.g., measure an exercise amount or blood sugar), or environmental information provision (e.g., provide air pressure, humidity, or temperature information).

According to an embodiment of the present disclosure, the application 370 may include an information exchange application for supporting information exchange between the electronic device (e.g., the electronic device 101) and an external electronic device (e.g., the first electronic device 102 or the second external electronic device 104). The information exchange application may include, for example, a notification relay application for relaying specific information to the external electronic device or a device management application for managing the external electronic device.

For example, the notification relay application may have a function for relaying, to an external electronic device (e.g., the first electronic device 102 or the second external electronic device 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 102 or the second external electronic device 104) communicating with the electronic device, an application running in the external electronic device, or a service (e.g., a call service, a message service, or the like) provided from the external electronic device.

According to an embodiment of the present disclosure, the application 370 may include a specified application (e.g., a healthcare application of a mobile medical device) according to an attribute of the external electronic device (e.g., the first electronic device 102 or the second external electronic device 104). The application 370 may include an application received from an external electronic device (e.g., the first electronic device 102 or the second external electronic device 104). The application 370 may include a preloaded application or a third-party application downloadable from a server. The names of the elements of the program module 310 illustrated may vary with the type of an OS.

According to various embodiments of the present disclosure, at least a part of the program module 310 may be implemented with software, firmware, hardware, or a combination thereof. At least a part of the program module 310, for example, may be implemented (e.g., executed) by a processor (e.g., the processor 210). At least a part of the program module 310 may include, for example, a module, a program, a routine, sets of instructions, or a process for performing at least one function.

Figure 4:
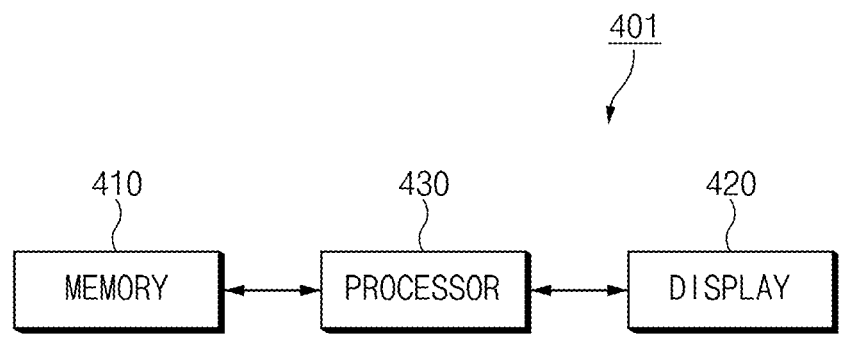
FIG. 4 is a block diagram illustrating a configuration of an electronic device according to an embodiment of the present disclosure.

FIG. 4 is a block diagram illustrating a configuration of an electronic device according to an embodiment of the present disclosure.

Referring to FIG. 4, an electronic device 401 may include, for example, all or a part of the electronic device 101 illustrated in FIG. 1. According to an embodiment of the present disclosure, the electronic device 401 may include a memory 410, a display 420, and a processor 430.

The memory 410 may store data associated with an application. The memory 410 may store the data (e.g., user data, a command, an image, and the like) associated with the application that is installed or is scheduled to be installed in the electronic device 401. According to an embodiment of the present disclosure, the memory 410 may include an icon image of the application. According to an embodiment of the present disclosure, the icon image may be an image of a specified size. For example, the icon image may be an image having a size of (192 pixels)*(192 pixels).

Application developers may receive the allocated image area of a specified size, which is associated with the icon image of the application, and may design an icon image in the image area of the specified size. The application developers may design the icon image by using all image area of the allocated size. However, the application developers may design the icon image without using a part of the allocated area. An area, which the application developers do not use, in the icon image of the specified size may not include a pixel value (or a color value) (e.g., a red value, a green value, a blue value, and an alpha value). For example, the icon image may include an effective pixel with the pixel value and a non-effective (or ineffective) pixel without the pixel value.

Figure 5:
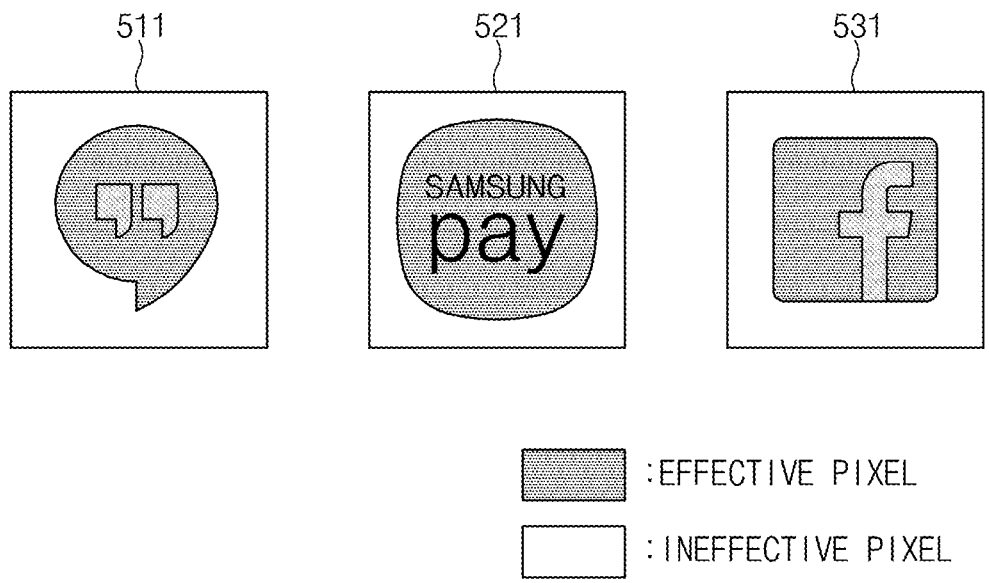
FIG. 5 is a diagram illustrating an icon image according to an embodiment of the present disclosure.

FIG. 5 is a diagram illustrating an icon image according to an embodiment of the present disclosure.

Referring to FIG. 5, a plurality of icon images 511, 521, and 531 are illustrated. Each of the plurality of icon images 511, 521, and 531 may include an effective pixel with a pixel value (or a color value) and a non-effective (or ineffective) pixel without the pixel value. When the icon image is displayed, effective pixels may be displayed according to pixel values, respectively. Non-effective pixels that do not include pixel values may be displayed as a background screen or may be displayed as specified colors.

The display 420 may display a user interface. For example, the display 420 may display the user interface including an icon image that an application provides. According to an embodiment of the present disclosure, the display 420 may change a size of an icon image under control of the processor 430 and may display the icon image of which the size is changed.

The processor 430 may control overall operations of the electronic device 100. According to an embodiment of the present disclosure, the processor 430 may display the icon image of the application in the display 420 according to various embodiments of the present disclosure by controlling each of the memory 410 and the display 420. According to an embodiment of the present disclosure, the processor 430 (e.g., an AP) may be implemented with an SoC including a CPU, a GPU, a memory, and the like.

According to an embodiment of the present disclosure, the processor 430 may install the application. The processor 430 may store data associated with the application, which is installed in the electronic device 401, in the memory 410.

According to an embodiment of the present disclosure, the processor 430 may receive an icon image (or a source image) corresponding to the application from the application. For example, the processor 430 may receive the icon image (or a memory address in which the icon image is stored) stored in the memory 410. According to an embodiment of the present disclosure, the icon image may be an image of a specified size (e.g., (192 pixels)*(192 pixels)).

Figure 6:
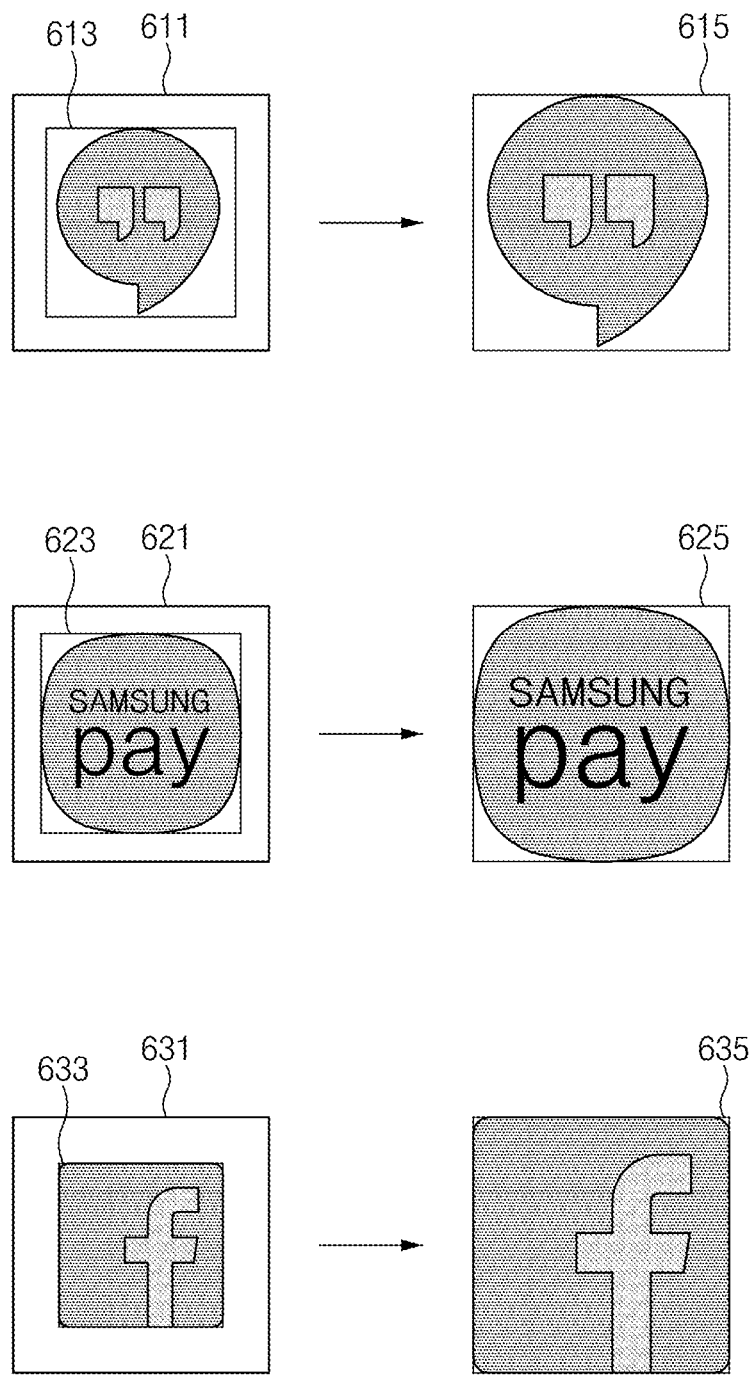
FIG. 6 illustrates a result in which a partial area of an icon image is selected according to an embodiment of the present disclosure.

FIG. 6 illustrates a result in which a partial area of an icon image is selected according to an embodiment of the present disclosure.

According to an embodiment of the present disclosure, the processor 430 may select (or crop) a partial area of the icon image received from an application. According to an embodiment of the present disclosure, the processor 430 may select (or crop) the partial area of the icon image based on whether a pixel included in the icon image is an effective pixel. The processor 430 may select a square area that includes all effective pixels included in the icon image and has the same center as the icon image. The processor 430 may select a square area of a minimum size in the square area that includes all effective pixels included in the icon image and has the same center as the icon image.

Referring to FIG. 6, a plurality of icon images 611, 621, and 631 that applications provide are illustrated. With regard to the plurality of icon images 611, 621, and 631, the processor 430 may select square areas 613, 623, and 633 of the minimum sizes in the square areas, each of which includes all effective pixels included in the icon image and has the same center as the icon image, respectively.

According to an embodiment of the present disclosure, the processor 430 may restore a size of the selected area in the icon image to an original size of the icon image. For example, referring to FIG. 6, the processor 430 may restore the selected areas 613, 623, and 633 to images 615, 625, and 635 of the same sizes as the original icon images 611, 621, and 631.

Figure 7:
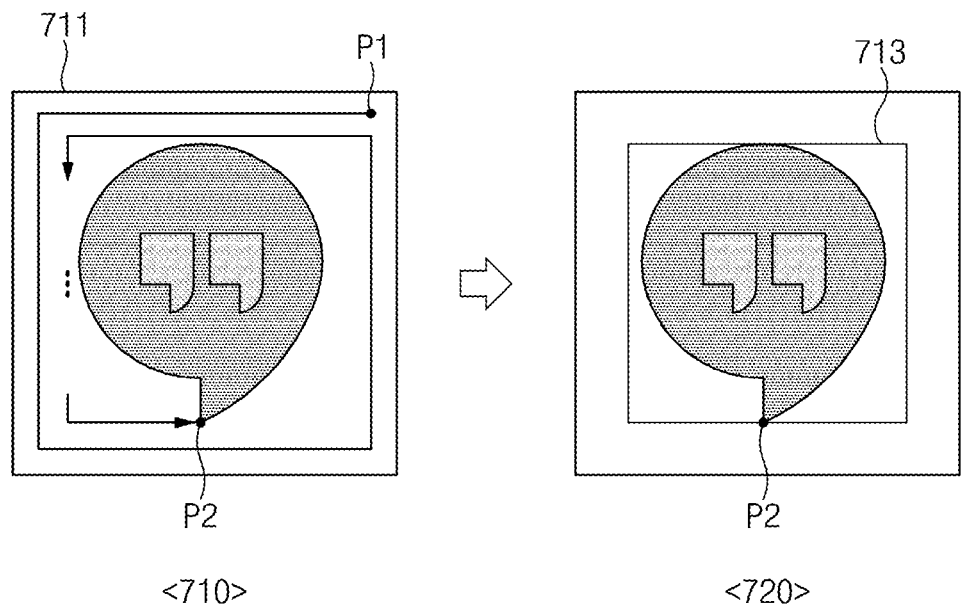
FIG. 7 illustrates a process of selecting a partial area of an icon image according to an embodiment of the present disclosure.

FIG. 7 illustrates a process of selecting a partial area of an icon image according to an embodiment of the present disclosure.

According to an embodiment of the present disclosure, when selecting the partial area of the icon image, the processor 430 may determine whether some of pixels included in the icon image are effective pixels. According to an embodiment of the present disclosure, the processor 430 may sequentially determine whether a specific pixel is an effective pixel, from a pixel, which is located in a border of the icon image, to a pixel located at a center of the icon image.

Referring to FIG. 7, the processor 430, in image 710, may sequentially determine whether the specific pixel is the effective pixel, along a border from a first pixel P1, which is located at the outermost corner of an icon image 711, in a counterclockwise. Afterwards, the processor 430 may verify a second pixel P2 as a first effective pixel. If the first effective pixel is verified, the processor 430 may end a process of determining whether a pixel included in the icon image is the effective pixel.

According to an embodiment of the present disclosure, the processor 430 may select a square area that has a side including a pixel, which is first verified as the effective pixel, and has the same center as the icon image. For example, referring to image 720 of FIG. 7, in the case where the second pixel P2 is first verified as the effective pixel, the processor 430 may select a square area 713 that includes the second pixel P2 as a side and has the same center as the icon image. Accordingly, the processor 430 may select a square area of a minimum size in the square area that includes all effective pixels included in the icon image and has the same center as the icon image.

According to an embodiment of the present disclosure, the processor 430 may determine whether the specific pixel is the effective pixel, based on whether the specific pixel has a pixel value. For example, the processor 430 may determine a pixel, which has a pixel value, from among pixels included in the icon image as the effective pixel. The processor 430 may determine a pixel, which does not have a pixel value, as a non-effective pixel.

According to an embodiment of the present disclosure, the processor 430 may determine whether the specific pixel is the effective pixel, based on whether the specific pixel has a pixel value and the opacity of the specific pixel. An opacity value (e.g., an alpha value) of the pixel may have, for example, a value of '0' to '100'. If the opacity value is '0', the pixel may be displayed to be completely transparent. If the opacity value is '100', the pixel may be displayed to be completely opaque. The processor 430 may verify the opacity value of the pixel having the pixel value. The processor 430 may determine a pixel, of which the opacity value is not less than a specified value (or a first reference value), from among the pixels having a pixel value as the effective pixel. The processor 430 may determine a pixel without a pixel value or a pixel of which the opacity value is less than a specified value (or the first reference value), from among pixels having a pixel value as the non-effective pixel. The first reference value may be, for example, '10'. For example, even though the specific pixel has a pixel value, the processor 430 may process the specific pixel as the non-effective pixel based on the opacity of a pixel. According to the above-described embodiment of the present disclosure, pixels with the low opacity value in the icon image may be excluded from effective pixels to show effects, such as a shadow, and the like. As such, the processor 430 may accurately select an area, which is recognized as a real icon by a user, in the icon image.

According to an embodiment of the present disclosure, the processor 430 may determine a type of an image included in the selected area. For example, the processor 430 may determine the type of the image included in the selected area as a first type or a second type. According to various embodiments of the present disclosure, the processor 430 may select at least one pixel included in the selected area and may determine the type of the image, which is included in the selected area, based on whether the selected pixel is the effective pixel.

According to an embodiment of the present disclosure, the processor 430 may determine whether the specific pixel is the effective pixel, based on whether the specific pixel has a pixel value and the opacity of a pixel. The processor 430 may verify the opacity value of the pixel having the pixel value. The processor 430 may determine a pixel, of which the opacity value is not less than a specified value (or a second reference value), from among the pixels having a pixel value as the effective pixel. The processor 430 may determine a pixel without a pixel value or a pixel of which the opacity value is less than a specified value (or the second reference value), from among pixels having a pixel value as the non-effective pixel. The second reference value may be, for example, '100'.

Figure 8:
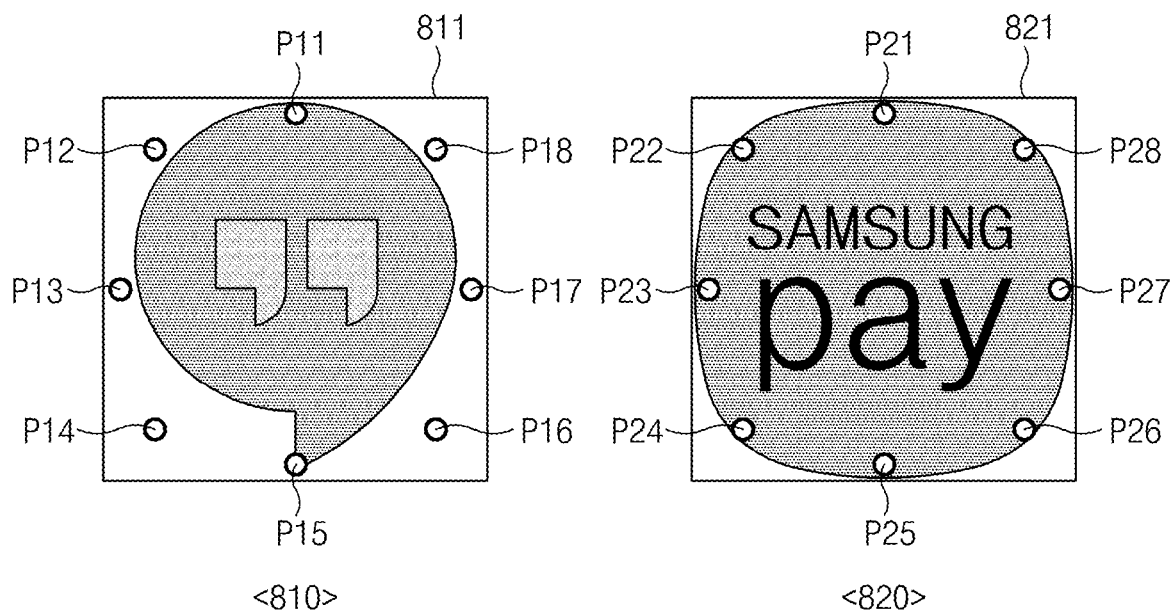
FIG. 8 illustrates a process of determining a type of an image according to an embodiment of the present disclosure.

FIG. 8 illustrates a process of determining a type of an image according to an embodiment of the present disclosure.

According to an embodiment of the present disclosure, the processor 430 may select a plurality of pixels of specified locations among pixels included in the selected area. According to an embodiment of the present disclosure, the processor 430 may verify the number of effective pixels among the selected plurality of pixels. For example, the processor 430 may determine whether each of the selected plurality of pixels is an effective pixel, and may verify the number of effective pixels among the selected plurality of pixels. According to an embodiment of the present disclosure, if the number of effective pixels is not less than a specified value (or a third reference value) (e.g., seven), the processor 430 may determine that a type of an image included in the selected area is a first type. If the number of effective pixels is less than the specified value (or the third reference value) (e.g., seven), the processor 430 may determine that the type of the image included in the selected area is a second type. According to an embodiment of the present disclosure, the third reference value may vary according to the number of selected pixels.

Referring to FIG. 8, the processor 430, in image 810, may select eight pixels P11, P12, P13, P14, P15, P16, P17, and P18, which are located at specified locations, from among pixels included in the selected area 811. The processor 430 may determine the first pixel P11 and the fifth pixel P15 among the selected eight pixels as effective pixels. The processor 430 may determine the remaining pixels P12, P13, P14, P16, P17, and P18 as non-effective pixels. As such, the processor 430 may verify the number of effective pixels among pixels of the selected eights as two. Since the verified number of effective pixels is less than a specified value (e.g., seven), the processor 430 may determine a type of an image included in the selected area 811 as the second type.

As another example, referring to image 820 of FIG. 8, the processor 430 may select eight pixels P21, P22, P23, P24, P25, P26, P27, and P28, which are located at specified locations, from among pixels included in a selected area 821. The processor 430 may determine all selected eight pixels P21, P22, P23, P24, P25, P26, P27, and P28 as effective pixels. As such, the processor 430 may verify the number of effective pixels among pixels of the selected eights as eight. Since the verified number of effective pixels is not less than the specified value (e.g., seven), the processor 430 may determine a type of an image included in the selected area 821 as the first type.

Figure 9:
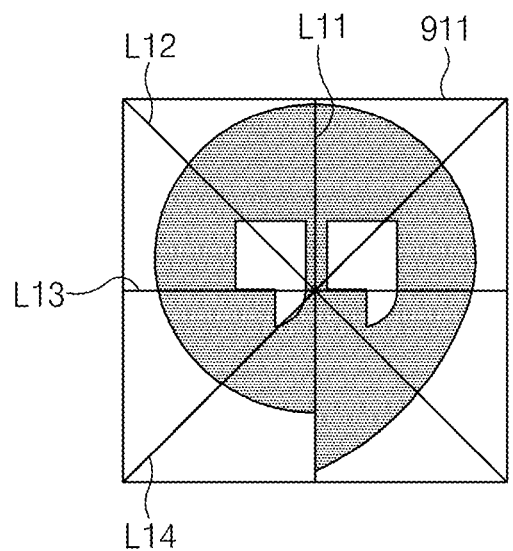
FIG. 9 illustrates a process of determining a type of an image according to an embodiment of the present disclosure.
Figure 9:
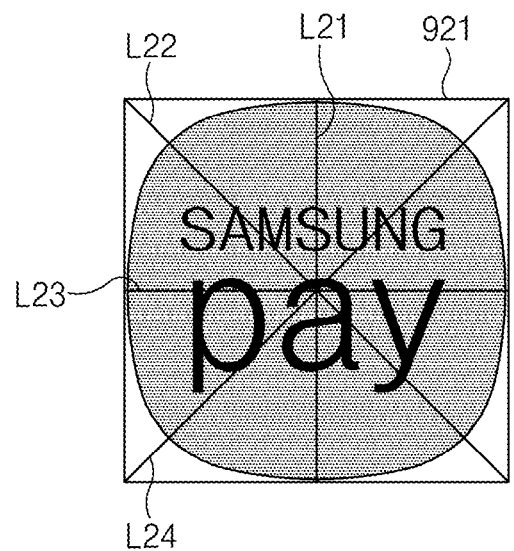

FIG. 9 illustrates a process of determining a type of an image according to an embodiment of the present disclosure.

According to an embodiment of the present disclosure, the processor 430 may generate one or more virtual straight lines that pass through a center of the selected area. According to an embodiment of the present disclosure, the processor 430 may verify the number of straight lines, in each of which a ratio of effective pixels to all pixels, from among the one or more virtual straight lines is not less than a specified value (e.g., 80%). For example, the processor 430 may select a plurality of pixels corresponding to each of virtual straight lines. The processor 430 may determine whether a plurality of pixels corresponding to each of the virtual straight lines are effective pixels and may verify the ratio of effective pixels for each virtual straight line. According to an embodiment of the present disclosure, if the number of straight lines in each of which the ratio of effective pixels is not less than a specified value (or a fourth reference value) (e.g., 80%) is not less than a specific value (or a fifth reference value) (e.g., three), the processor 430 may determine that a type of an image included in the selected area is a first type. If the number of straight lines in each of which the ratio of effective pixels is not less than the specified value (or the fourth reference value) (e.g., 80%) is less than the specific value (or the fifth reference value) (e.g., three), the processor 430 may determine that the type of the image included in the selected area is a second type. According to an embodiment of the present disclosure, the fifth reference value may vary according to the number of generated virtual straight lines.

Referring to FIG. 9, the processor 430, in image 910, may generate four virtual straight lines L12, L12, L13, and L14 that pass through a center of a selected area 911. The processor 430 may determine whether pixels corresponding to each of four virtual straight lines L12, L12, L13, and L14 are effective pixels and may verify the ratio of effective pixels of each of the virtual straight lines. For example, the processor 430 may determine the ratio of effective pixels of the first straight line L11 as 96%. The processor 430 may determine the ratio of effective pixels of the second straight line L12 as 66%. The processor 430 may determine the ratio of effective pixels of the third straight line L13 as 78%. The processor 430 may determine the ratio of effective pixels of the fourth straight line L14 as 64%. The processor 430 may compare the ratio of effective pixels of each virtual straight line with the specified value (e.g., 80%) and may verify the number of straight lines, in each of which the ratio of effective pixels is not less than the specified value, as one (e.g., the first straight line L11). Since the number of straight lines, in each of which the ratio of effective pixels is not less than the specified value, is less than the specific value (e.g., three), the processor 430 may determine that a type of an image included in the selected area 911 is the second type.

As another example, referring to image 920 of FIG. 9, the processor 430 may generate four virtual straight lines L21, L22, L23, and L24 that pass through a center of a selected area 921. The processor 430 may determine whether pixels corresponding to each of four virtual straight lines L21, L22, L23, and L24 are effective pixels and may verify the ratio of effective pixels of each of the virtual straight lines. For example, the processor 430 may determine the ratio of effective pixels of the first straight line L21 as 96%. The processor 430 may determine the ratio of effective pixels of the second straight line L22 as 82%. The processor 430 may determine the ratio of effective pixels of the third straight line L23 as 96%. The processor 430 may determine the ratio of effective pixels of the fourth straight line L24 as 82%. The processor 430 may compare the ratio of effective pixels of each virtual straight line with the specified value (e.g., 80%) and may verify the number of straight lines, in each of which the ratio of effective pixels is not less than the specified value, as four (e.g., the first to fourth straight lines L21 to L24). Since the number of straight lines, in each of which the ratio of effective pixels is not less than the specified value, is not less than the specific value (e.g., three), the processor 430 may determine that the type of an image included in the selected area 921 is the first type.

According to an embodiment of the present disclosure, the processor 430 may verify a mean value of the ratio of effective pixels of at least one virtual straight line. If the mean value is not less than a specified value (or a sixth reference value) (e.g., 82%), the processor 430 may determine a type of an image included in the selected area as the first type. If the mean value is less than the specified value (or the sixth reference value) (e.g., 82%), the processor 430 may determine the type of the image included in the selected area as the second type.

For example, referring to image 910 of FIG. 9, the processor 430 may determine the ratio of effective pixels of the first straight line L11 as 96%. The processor 430 may determine the ratio of effective pixels of the second straight line L12 as 66%. The processor 430 may determine the ratio of effective pixels of the third straight line L13 as 78%. The processor 430 may determine the ratio of effective pixels of the fourth straight line L14 as 64%. The processor 430 may verify the mean value of the ratio effective pixels of each of four virtual straight lines L12, L12, L13, and L14 as 76%. Since the mean value is less than the specified value (e.g., 82%), the processor 430 may determine the type of an image included in the selected area 911 as the second type.

For example, referring to image 920 of FIG. 9, the processor 430 may determine the ratio of effective pixels of the first straight line L21 as 96%. The processor 430 may determine the ratio of effective pixels of the second straight line L22 as 82%. The processor 430 may determine the ratio of effective pixels of the third straight line L23 as 96%. The processor 430 may determine the ratio of effective pixels of the fourth straight line L24 as 82%. The processor 430 may verify the mean value of the ratio effective pixels of each of four virtual straight lines L21, L22, L23, and L24 as 89%. Since the mean value is not less than the specified value (e.g., 82%), the processor 430 may determine the type of an image included in the selected area 921 as the first type.

According to an embodiment of the present disclosure, the processor 430 may select all pixels included in the selected area and may verify the ratio of effective pixels among all pixels included in the selected area. If the ratio of effective pixels is not less than the specified value (or a seventh reference value) (e.g., 80%), the processor 430 may determine the type of the image included in the selected area as the first type. If the ratio of effective pixels is less than the specified value (or the seventh reference value) (e.g., 80%), the processor 430 may determine the type of the image included in the selected area as the second type.

According to an embodiment of the present disclosure, the processor 430 may display the image, which is included in the selected area, in the display 420. According to an embodiment of the present disclosure, the processor 430 may display the image at a magnification corresponding to the type of the image included in the selected area. For example, if the type of the image included in the selected area is the first type, the processor 430 may display the image included in the selected area at a first magnification. As another example, if the type of the image included in the selected area is the second type, the processor 430 may display the image included in the selected area at a second magnification different from the first magnification. According to an embodiment of the present disclosure, the second magnification may be a magnification that is higher than the first magnification. For example, the first magnification may be 88%, and the second magnification may be 94%. In the case where the image is displayed at a magnification of 100%, for example, an icon image may be displayed in an area in which the icon image is displayed, such that the icon image fills the area. In the case where the image is displayed at a magnification of 90%, for example, the icon image may be displayed in an area in which the icon image is displayed, such that the icon image has a horizontal size of 90% and a vertical size of 90%.

Figure 10:
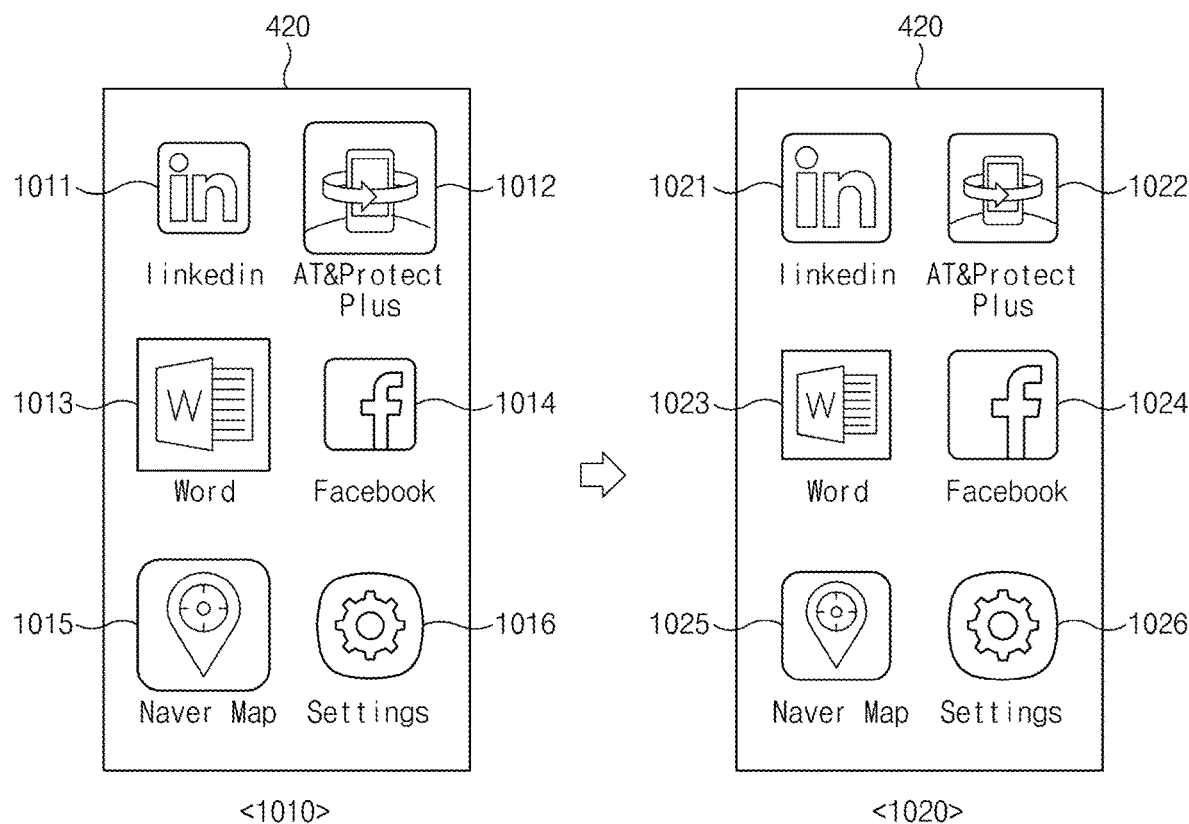
FIG. 10 illustrates an icon image displayed according to an embodiment of the present disclosure.

FIG. 10 illustrates an icon image displayed according to an embodiment of the present disclosure.

Referring to FIG. 10, image 1010 illustrates a state in which an icon image that an application provides is displayed in a display as it is. Image 1020 of FIG. 10 illustrates a state in which a size of an icon image is changed according to various embodiments of the present disclosure and the icon image of the changed size is displayed in the display.

Referring to image 1010 of FIG. 10, in the case where the icon image that the application provides is originally displayed in the display, sizes of a plurality of icons 1011 to 1016 may be different from each other. For example, the first icon 1011, the fourth icon 1014, and the sixth icon 1016 may be displayed to be smaller than the second icon 1012, the third icon 1013, and the fifth icon 1015, respectively.

Referring to image 1020 of FIG. 10, in the case where the magnification of the icon image is changed according to various embodiments of the present disclosure, the plurality of icons may be displayed at a specific size. For example, the first icon 1021 and the fourth icon 1024 may be displayed such that each of sizes thereof is greater than an original size. The second icon 1022, the third icon 1023, and the fifth icon 1025 may be displayed such that each of sizes thereof is smaller than the original size. The sixth icon 1026 may be displayed such that the size of the sixth icon 1016 is the same as the size of the original image.

Figure 11:
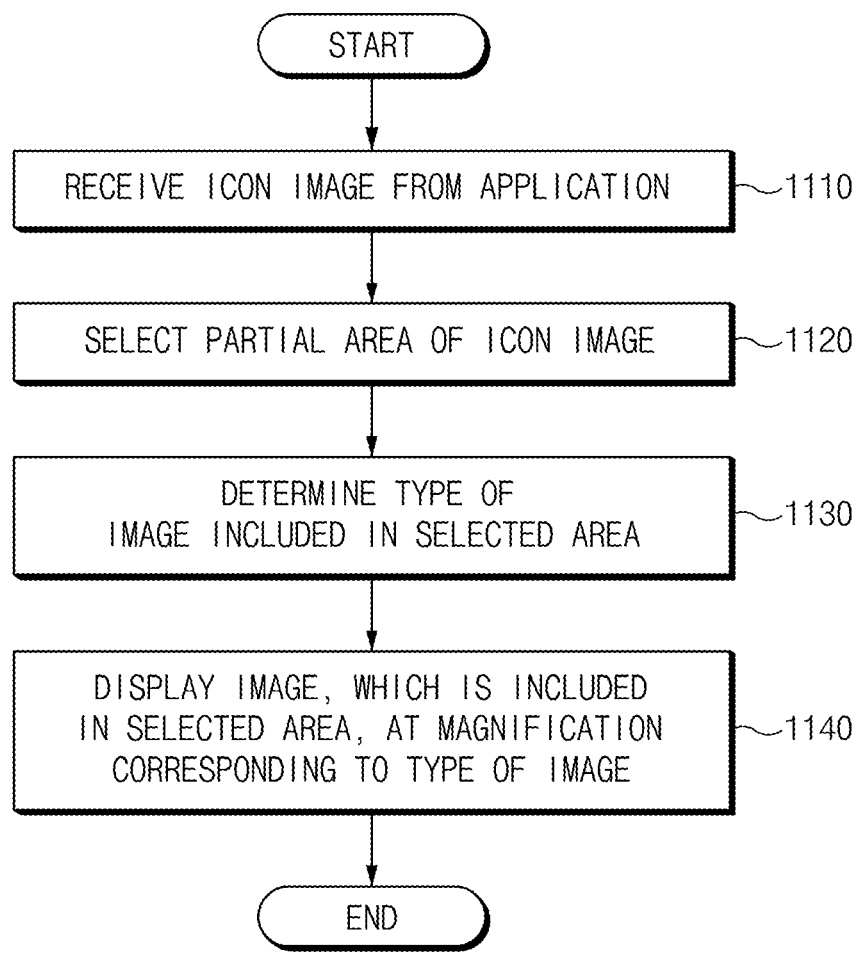
FIG. 11 is a flowchart illustrating a display method of an electronic device according to an embodiment of the present disclosure.

FIG. 11 is a flowchart illustrating a display method of an electronic device according to an embodiment of the present disclosure.

Referring to FIG. 11, the flowchart may include operations that the above-described electronic device (e.g., the electronic device 401) processes. Even though omitted below, detailed descriptions about the electronic device described with reference to FIGS. 1 to 10 may be applied to the flowchart shown in FIG. 11.

According to an embodiment of the present disclosure, in operation 1110, the electronic device (e.g., the processor 430) may receive an icon image corresponding to an application from the application. For example, the electronic device may receive the icon image (or a memory address in which the icon image is stored) stored in the memory 410. According to an embodiment of the present disclosure, the icon image may be an image of a specified size (e.g., (192 pixels)*(192 pixels)).

According to an embodiment of the present disclosure, in operation 1120, the electronic device (e.g., the processor 430) may select (or crop) a partial area of the icon image. According to an embodiment of the present disclosure, the electronic device may select a partial area of the icon image based on whether a pixel included in the icon image is an effective pixel.

According to an embodiment of the present disclosure, the electronic device may select a square area of a minimum size in a square area that includes all effective pixels included in an icon image and has the same center as the icon image. For example, the electronic device may sequentially determine whether a specific pixel is an effective pixel, from a pixel, which is located in a border of the icon image, to a pixel located at a center of the icon image. The electronic device may select the square area that has a side including a pixel, which is first verified as the effective pixel, and has the same center as the icon image.

According to an embodiment of the present disclosure, the electronic device may determine whether the specific pixel is the effective pixel, based on whether the specific pixel has a pixel value. According to an embodiment of the present disclosure, the electronic device may determine whether the specific pixel is the effective pixel, based on whether the specific pixel has a pixel value and the opacity of a pixel. For example, the electronic device may verify the opacity value of the pixel having the pixel value. The electronic device may determine a pixel, of which the opacity value is not less than a specified value (or a first reference value), from among the pixels having a pixel value as the effective pixel. The electronic device may determine a pixel without a pixel value or a pixel of which the opacity value is less than a specified value (or a first reference value), from among pixels having a pixel value as the non-effective pixel.

According to an embodiment of the present disclosure, in operation 1130, the electronic device (e.g., the processor 430) may determine a type of an image included in the selected area. For example, the electronic device may determine the type of the image included in the selected area as a first type or a second type.

According to various embodiments of the present disclosure, the electronic device may select at least one pixel included in the selected area and may determine the type of the image, which is included in the selected area, based on whether the selected pixel is the effective pixel. According to an embodiment of the present disclosure, the electronic device may determine whether the specific pixel is the effective pixel, based on whether the specific pixel has a pixel value and the opacity of a pixel. The electronic device may verify the opacity value of the pixel having the pixel value. The electronic device may determine a pixel, of which the opacity value is not less than a specified value (or a second reference value), from among the pixels having a pixel value as the effective pixel. The electronic device may determine a pixel without a pixel value or a pixel of which the opacity value is less than a specified value (or the second reference value), from among pixels having a pixel value as the non-effective pixel.

According to an embodiment of the present disclosure, the electronic device may select a plurality of pixels of specified locations among pixels included in the selected area. According to an embodiment of the present disclosure, the electronic device may verify the number of effective pixels among the selected plurality of pixels. For example, the electronic device may determine whether each of the selected plurality of pixels is an effective pixel, and may verify the number of effective pixels among the selected plurality of pixels. According to an embodiment of the present disclosure, if the number of effective pixels is not less than a specified value (or a third reference value) (e.g., seven), the electronic device may determine that a type of an image included in the selected area is a first type. If the number of effective pixels is less than the specified value (or the third reference value) (e.g., seven), the electronic device may determine that the type of the image included in the selected area is a second type. According to an embodiment of the present disclosure, the third reference value may vary according to the number of selected pixels.

According to an embodiment of the present disclosure, the electronic device may generate one or more virtual straight lines that pass through a center of the selected area. According to an embodiment of the present disclosure, the electronic device may verify the number of straight lines, in each of which a ratio of effective pixels to all pixels, from among the one or more virtual straight lines is not less than a specified value (e.g., 80%). For example, the electronic device may select a plurality of pixels corresponding to each of virtual straight lines. The electronic device may determine whether a plurality of pixels corresponding to each of the virtual straight lines are effective pixels and may verify the ratio of effective pixels for each virtual straight line. According to an embodiment of the present disclosure, if the number of straight lines in each of which the ratio of effective pixels is not less than a specified value (or a fourth reference value) (e.g., 80%) is not less than a specific value (or a fifth reference value) (e.g., three), the electronic device may determine that a type of an image included in the selected area is a first type. If the number of straight lines in each of which the ratio of effective pixels is not less than the specified value (or the fourth reference value) (e.g., 80%) is less than the specific value (or the fifth reference value) (e.g., three), the electronic device may determine that the type of the image included in the selected area is a second type. According to an embodiment of the present disclosure, the fifth reference value may vary according to the number of generated virtual straight lines.

According to an embodiment of the present disclosure, the electronic device may verify a mean value of the ratio of effective pixels of at least one virtual straight line. If the mean value is not less than a specified value (or a sixth reference value) (e.g., 82%), the processor 430 may determine a type of an image included in the selected area as the first type. If the mean value is less than the specified value (or the sixth reference value) (e.g., 82%), the electronic device may determine the type of the image included in the selected area as the second type.

According to an embodiment of the present disclosure, the electronic device may select all pixels included in the selected area and may verify the ratio of effective pixels among all pixels included in the selected area. If the ratio of effective pixels is not less than the specified value (or a seventh reference value) (e.g., 80%), the electronic device may determine the type of the image included in the selected area as the first type. If the ratio of effective pixels is less than the specified value (or the seventh reference value) (e.g., 80%), the electronic device may determine the type of the image included in the selected area as the second type.

According to an embodiment of the present disclosure, in operation 1140, the electronic device (e.g., the processor 430) may display the image, which is included in the selected area, in a display at a magnification corresponding to a type of the image. For example, if the type of the image included in the selected area is the first type, the electronic device may display the image included in the selected area at a first magnification. As another example, if the type of the image included in the selected area is the second type, the electronic device may display the image included in the selected area at a second magnification different from the first magnification. According to an embodiment of the present disclosure, the second magnification may be a magnification that is higher than the first magnification.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, icons may be identically displayed in a display with the same size, and thus, a size balance between icons may be matched and the completeness of a user interface may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a memory configured to store an icon image associated with an application; and
   a processor configured to:
      select a minimum square area of the icon image including all effective pixels included in the icon image, wherein each opacity value of the effective pixels is more than a first specified value,
      generate a number of straight lines that pass through a center of the selected minimum square area,
      determine whether a type of the selected minimum square area is a first image type or a second image type, based on the number of straight lines, in each of which a ratio of effective pixels in a straight line to all pixels in the straight line is not less than a second specified value, from among at least one virtual straight line that passes through the center of the selected minimum square area, or a mean value of a ratio of effective pixels to all pixels in the at least one virtual straight line,
      if the type is the first image type, display an image included in the selected minimum square area in the display at a first magnification,
      if the type is the second image type, display the image included in the selected minimum square area in the display at a second magnification,
      if the number of straight lines is not less than the second specific value or the mean value is not less than a third specified value, determine that the type of the selected minimum square area is the first image type, and
      if the number of straight lines is less than the second specific value or the mean value is less than the third specified value, determine that the type of the selected minimum square area is the second image type.

2. The electronic device of claim 1, wherein the minimum square area has the center which is same as of a center of the icon image.

3. The electronic device of claim 2, wherein the processor is further configured to:
- sequentially determine whether a specific pixel is an effective pixel, from a pixel located at a border of the icon image to a pixel located at the center of the icon image, and
- select the minimum square area that has a side including a pixel, which is first verified as the effective pixel.

4. A display method of an electronic device, the method comprising:
- storing an icon image associated with an application in a memory;
- selecting a minimum square area of the icon image including all effective pixels included in the icon image, wherein each opacity value of the effective pixels is more than a first specified value;
- generating a number of straight lines that pass through a center of the selected minimum square area,
- determining whether a type of the selected minimum square area is a first image type or a second image type, based on a number of straight lines, in each of which a ratio of effective pixels in a straight line to all pixels in the straight line is not less than a second specified value, from among at least one virtual straight line that passes through the center of the selected minimum square area, or a mean value of a ratio of effective pixels to all pixels in the at least one virtual straight line;
- if the type is the first image type, displaying an image included in the selected minimum square area in the display at a first magnification; and
- if the type is the second image type, displaying the image included in the selected minimum square area in the display at a second magnification,
- wherein the determining of whether the type of the selected minimum square area is the first image type or the second image type further comprises:
  - if the number of straight lines is not less than the second specified value or the mean value is not less than a third specified value, determine that the type of the selected minimum square area is the first image type, and
  - if the number of straight lines is less than the second specified value or the mean value is less than the third specified value, determine that the type of the selected minimum square area is the second image type.

5. The method of claim 4, wherein the minimum square area has the center which is same as a center of the icon image.

6. The method of claim 5, wherein the selecting of the square area comprises:
- sequentially determining whether a specific pixel is an effective pixel, from a pixel located at a border of the icon image to a pixel located at the center of the icon image; and
- selecting the minimum square area that has a side including a pixel, which is first verified as the effective pixel.

7. At least one non-transitory computer-readable recording medium recorded with a program, the program, when executed, performing a method, the method comprising:
- storing an icon image associated with an application in a memory;
- selecting a minimum square area of the icon image including all effective pixels included in the icon image, wherein each opacity value of the effective pixels is more than a first specified value;
- generating a number of straight lines that pass through a center of the selected minimum square area,
- determining whether a type of the selected minimum square area is a first image type or a second image type based on a number of straight lines, in each of which a ratio of effective pixels in a straight line to all pixels in the straight line is not less than a second specified value, from among at least one virtual straight line that passes through the center of the selected minimum square area, or a mean value of a ratio of effective pixels to all pixels in the at least one virtual straight line;
- if the type is the first image type, displaying an image included in the selected minimum square area in the display at a first magnification; and
- if the type is the second image type, displaying the image included in the selected minimum square area in the display at a second magnification,
- wherein the determining of whether the type of the selected minimum square area is the first image type or the second image type further comprises:
  - if the number of straight lines is not less than the second specified value or the mean value is not less than a third specified value, determine that the type of the selected minimum square area is the first image type, and
  - if the number of straight lines is less than the second specified value or the mean value is less than the third specified value, determine that the type of the selected minimum square area is the second image type.

* * * * *